US008475890B2

(12) United States Patent
Jeong et al.

(10) Patent No.: US 8,475,890 B2
(45) Date of Patent: Jul. 2, 2013

(54) COLORED MATERIAL COATED TRANSPARENT CHIP FOR ARTIFICIAL STONE, METHOD OF PREPARING SAME, AND ARTIFICIAL STONE INCLUDING SAME

(75) Inventors: Doo Kyo Jeong, Uiwang-si (KR); Soo Jheong Choi, Uiwang-si (KR); Hee Cheol Lee, Uiwang-si (KR); Han Ju Kang, Uiwang-si (KR); Chang Ho Son, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/898,944

(22) Filed: Oct. 6, 2010

(65) Prior Publication Data

US 2011/0111141 A1 May 12, 2011

(30) Foreign Application Priority Data

Nov. 10, 2009 (KR) .................. 10-2009-0108206
Apr. 23, 2010 (KR) .................. 10-2010-0037694

(51) Int. Cl.
*B32B 7/00* (2006.01)
*C04B 26/02* (2006.01)
(52) U.S. Cl.
USPC .......... 428/15; 428/320.2; 428/323; 428/325; 428/327; 252/301.34; 252/301.35; 252/301.36; 252/301.4 R
(58) Field of Classification Search
USPC ... 428/15–17, 320.2, 323, 325, 327; 252/301, 252/34, 35, 36, 301.4 R
See application file for complete search history.

(56) References Cited

U.S. PATENT DOCUMENTS 6,146,548 A 11/2000 Sakai
6,309,562 B1 10/2001 Sakai et al.
(Continued)

FOREIGN PATENT DOCUMENTS

DE 19944593 A1 4/2000
JP 05-279575 10/1993
(Continued)

OTHER PUBLICATIONS

European Search Report in counterpart European Application No. 10190538 dated Apr. 1, 2011, pp. 1-5.
(Continued)

*Primary Examiner* — Cathy Lam
(74) *Attorney, Agent, or Firm* — Summa, Additon & Ashe, P.A.

(57) ABSTRACT

The present invention provides transparent chips with natural metal-like texture by coating silica-containing transparent chips with colored material, such as a metal powder, in a transparent resin as a base resin. The present invention also provides artificial stone with natural metal-like texture and patterns by mixing the colored material coated transparent chips and inorganic filler with a matrix resin. The artificial stone of the present invention can be prepared by mixing about 4 to about 24 parts by weight of inorganic filler and about 0.1 to about 5.0 parts by weight of the colored material coated transparent chips, per about 1 part by weight of the matrix resin. The colored material coated transparent chips can have a specific gravity of about 2.0 to about 2.65, while the matrix resin can have a specific gravity of about 2.2 to about 2.8, and the specific gravity of the transparent chips can be equal to or lower than the specific gravity of the matrix resin in promote uniform distribution of the transparent chips in the matrix resin.

17 Claims, 2 Drawing Sheets

U.S. PATENT DOCUMENTS

| | | | |
|---|---|---|---|
| 6,387,985 B1 * | 5/2002 | Wilkinson et al. | 523/171 |
| 6,695,904 B2 * | 2/2004 | Burger et al. | 106/287.14 |
| 6,702,514 B2 * | 3/2004 | Kaneko et al. | 404/32 |
| 8,026,298 B2 * | 9/2011 | Buskila et al. | 523/171 |
| 8,133,575 B2 | 3/2012 | Rha et al. | |
| 2003/0087074 A1 | 5/2003 | Yamanashi et al. | |
| 2007/0281114 A1 | 12/2007 | Rha et al. | |

FOREIGN PATENT DOCUMENTS

| | | |
|---|---|---|
| JP | 07-033500 A | 2/1995 |
| KR | 10-1998-0036300 | 8/1998 |
| KR | 2009-59901 A | 6/2009 |
| KR | 2009-88147 A | 8/2009 |
| WO | 03/040053 A2 | 5/2003 |
| WO | 2006/065042 A1 | 6/2006 |
| WO | 2008/137129 A1 | 11/2008 |
| WO | 2009/040753 A2 | 4/2009 |

OTHER PUBLICATIONS

Australian Office Action in counterpart Australian Application No. 2010214758 dated Apr. 1, 2011, pp. 1-2.

Office Action in commonly owned U.S. Appl. No. 11/808,050 mailed Apr. 2, 2010, pp. 1-10.

Office Action in commonly owned U.S. Appl. No. 11/808,050 mailed Oct. 21, 2010, pp. 1-7.

Final Office Action in commonly owned U.S. Appl. No. 11/808,050 mailed May 11, 2011, pp. 1-8.

Notice of Allowance in commonly owned U.S. Appl. No. 11/808,050 mailed Oct. 31, 2011, pp. 1-7.

Supplemental Notice of Allowability in commonly owned U.S. Appl. No. 11/808,050 mailed Nov. 7, 2011, pp. 1-5.

* cited by examiner

COLORED MATERIAL COATED TRANSPARENT CHIP FOR ARTIFICIAL STONE, METHOD OF PREPARING SAME, AND ARTIFICIAL STONE INCLUDING SAME

CROSS-REFERENCE TO RELATED APPLICATIONS

This application claims priority from Korean Patent Application Nos. 2009-108206 and 2010-37694, entitled "Colored Material Coated Transparent Chip and Native Rock Combined With Resin Composition Including The Same," which were filed on Nov. 10, 2009, and Apr. 23, 2010, respectively, the latter claiming priority based on the former, and which are hereby incorporated by reference in their entirety.

FIELD OF THE INVENTION

The present invention relates to artificial stone, which can have a natural metal-like texture and appearance and transparent chips for preparing the same.

BACKGROUND OF THE INVENTION

In general, artificial stone is an artificial synthetic article having a natural stone-like texture and appearance, which can be prepared by mixing natural metals in a resin. Two types of artificial stone include unsaturated polyester resin based artificial stone and acrylic resin based artificial stone.

Artificial stone may be used as an interior building material in place of natural stone, e.g. to form kitchen counter tops, wash bowls, dressing tables, bathtubs, wall panels, commercial counters, and so forth, due to its stone-like appearance, high quality texture, and good weatherability.

Artificial stone can be prepared with a single color, with multiple colors by mixing different resins with different colors, or with a natural stone-like texture and appearance by employing chips coated with various materials.

An important goal in artificial stone technology is imitating the natural marble-like texture and appearance of natural stone to provide a high quality product to meet consumer demand. Accordingly, there has been a great deal of research directed to preparing artificial stone having natural stone-like texture and patterns.

Korean Patent Publication No. 2009-59901 discloses an artificial stone including colored glass chips or colored mirror chips, which are prepared with a colored resin composition. Epoxy resin is employed as a base resin for the artificial stone composition or the colored resin composition.

Korean Patent Publication No. 2009-88147 discloses an unsaturated polyester artificial stone containing gold chips in which silica and/or inorganic material is coated with aqueous pearl pigments.

It is very difficult, however, to impart natural stone-like patterns and textures to artificial stone, and neither of the above referenced patent applications provides a high quality artificial stone with natural stone-like patterns and textures. One reason is that it is very difficult to prepare natural-like transparent chips. Another reason is that it is very difficult to uniformly distribute the transparent chips in the matrix resin so as to prevent the so-called "breaking" phenomena between the transparent chips and the matrix resin.

SUMMARY OF THE INVENTION

The present inventors have developed transparent chips having a natural metal-like texture, which can be used in the production of artificial stone articles. The transparent chips of the invention include silica-containing transparent chips and a transparent resin as a base resin, which are coated with a colored material, such as a metal powder. The transparent chips of the invention can be uniformly distributed in a matrix resin by using a transparent chip with a specific gravity that is lower than the specific gravity of the matrix resin. This can prevent or minimize the breaking phenomena that can occur between chips and a matrix resin.

Embodiments of the present invention are therefore directed to a colored material coated transparent chip for artificial stone, method of preparing the transparent chip, and artificial stone containing the same, which can substantially overcome one or more problems due to the limitations and disadvantages of the related art.

Exemplary silica-containing transparent chips include without limitation broken-stone chips, quartz chips, quartz-silica chips, silica stone powder, quartz glass chips, synthetic quartz chips, silica chips, silicon dioxide chips, silica glass chips and mirror chips.

Exemplary colored materials include without limitation gold powder, silver powder, copper powder, aluminum powder, nickel powder and the like. The colored materials can be used singly or in combination with one another.

The transparent resin used as a base resin can have an APHA (American Public Health Association) color index of about 10 to about 70 when measured in accordance with ASTM D 4890. Exemplary transparent resins include without limitation urethane acrylate resins, unsaturated polyester resins, polyester polyol resins and the like. The transparent resins can be used singly or in combination with one another.

A curing agent can be used in the preparation of the transparent chips for artificial stone of the present invention. Exemplary curing agents include without limitation peroxy esters, polyisocyanates, peroxides and the like.

The transparent chips for artificial stone of the present invention can be prepared by mixing about 80 to about 500 parts by weight of silica-containing transparent chips, about 0.1 to about 5.0 parts by weight of colored material, and about 0.01 to about 2.5 parts by weight of curing agent, per about 1 part by weight of a transparent resin to form a resin mixture, curing the resin mixture in a dry oven, and drying the cured resin mixture at room temperature.

In the present invention, the colored material coated transparent chips can have a specific gravity of about 2.0 to about 2.65 and a Mohs hardness of about 5 to about 9.

At least one of the above and other features and advantages may be realized by providing artificial stone with natural metal-like texture and patterns by mixing the colored material coated transparent chips and inorganic filler with a matrix polymer resin. The artificial stone of the present invention can be prepared by mixing about 4 to about 24 parts by weight of inorganic filler and about 0.1 to about 5.0 parts by weight of the colored material coated transparent chips, per about 1 part by weight of a matrix resin. A small amount of curing agent, cross-linking agent, pigment powder, and/or catalyst may be added to the mixture.

In other exemplary embodiments of the invention, the artificial stone can be prepared by mixing about 4 to about 24 parts by weight of inorganic filler, about 0.1 to about 5.0 parts by weight of the colored material coated transparent chips, about 0.01 to about 0.05 parts by weight of a curing agent, about 0.01 to about 0.05 parts by weight of a cross-linking agent, about 0.01 to about 0.15 parts by weight of a pigment powder, and about 0.001 to about 0.005 parts by weight of a catalyst, per about 1 part by weight of an unsaturated polyester resin as a matrix resin, forming the resin mixture in a mold, pressing the resin mixture, and surface-treating the resultant article. The colored material coated transparent chips can have a specific gravity of about 2.0 to about 2.65, while the matrix resin can have a specific gravity of about 2.2 to about 2.8. Using transparent chips with a specific gravity equal to or lower than the specific gravity of the matrix resin can promote uniform distribution of the transparent chips in the matrix resin.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
FIG. 1 is a photograph of exemplary colored material coated transparent chips prepared in accordance with the present invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention relates to artificial stone which can have a natural metal-like texture and appearance and transparent chips for preparing the same. The transparent chips are prepared by coating silica-containing transparent chips with colored material.

The transparent chips can have a natural metal-like texture and are prepared by coating silica-containing transparent chips with a colored material, such as a metal powder, in a transparent resin as a base resin. The use of silica-containing transparent chips and transparent resin can impart a natural metal-like texture and pattern to the chips. The colored material may be deposited on the silica-containing transparent chips.

Exemplary silica-containing transparent chips include without limitation broken-stone chips, quartz chips, quartz-silica chips, silica stone powder, quartz glass chips, synthetic quartz chips, silica chips, silicon dioxide chips, silica glass chips, mirror chips, and the like. The silica-containing transparent chips can be used singly or as a mixture of at least two or more different kinds of chips.

Exemplary colored materials include without limitation gold powder, silver powder, copper powder, aluminum powder, nickel powder and the like. The colored material may be used singly or as a combination or at least two or more thereof. The colored material may comprise further aluminum paste, glitter, or a mixture thereof.

The transparent resin which is used as a base resin in the transparent chips can have an APHA (American Public Health Association) color index of about 10 to about 70 when measured in accordance with ASTM D 4890. The transparent resin having an APHA color index of about 10 to about 70 can provide the transparent chips with natural metal-like texture and patterns. Exemplary transparent resins include without limitation urethane acrylate resins, unsaturated polyester resins, polyester polyol resins and the like. The transparent resins can be used singly or in combination with one another.

A curing agent can be used in the preparation of the transparent chips for artificial stone of the present invention. Exemplary curing agents include without limitation peroxy esters, polyisocyanates, peroxides and the like.

In the present invention, particular combinations of the transparent resin and curing agent may provide advantageous properties and qualities to the transparent chips. In one embodiment, the transparent resin can be a urethane acrylate resin and the curing agent can be an isocyanate. In this case, urethane acrylate resin can be used in an amount of about 20 to about 50% by weight and isocyanate in an amount of about 50 to about 80% by weight. In another embodiment, the transparent resin can be an unsaturated polyester resin and the curing agent can be a peroxy ester. In this case, unsaturated polyester resin can be used in an amount of about 20 to about 50% by weight and peroxy ester in an amount of about 50 to about 80% by weight.

Exemplary unsaturated polyester resins useful as the transparent resin in this invention can be prepared by mixing about 40 to about 90% by weight of an unsaturated polyester resin including units derived from saturated and unsaturated acids and at least one glycol with about 10 to 60% by weight of one or more monomers for controlling viscosity. The monomers can dilute the unsaturated polyester resin so as to control viscosity. Exemplary monomers for controlling viscosity may include without limitation reactive monomers such as styrene monomer (SM) or diallyl phthalate (DAP). The reactive monomer can function as a diluent to liquidize the unsaturated polyester resin at room temperature as well as connect polymer chains by participating in the polymerization.

Exemplary glycols for the unsaturated polyester resin include without limitation ethylene glycol, diethylene glycol, propylene glycol, dipropylene glycol, 1,3-buthane diol, 1,6-hexane diol, secondary alcohols such as neopentyl glycol, tertiary alcohols such as glycerin, and quaternary alcohols such as pentaerythrytol, and the like, and combinations thereof. Exemplary saturated acids include without limitation phthalic anhydride, terephthalic acid, isophthalic acid and the like, and combinations thereof, and exemplary unsaturated acids include without limitation maleic acid, fumaric acid, itaconic acid and the like, and combinations thereof.

The transparent chips for artificial stone of the present invention can be prepared by mixing about 80 to about 500 parts by weight of silica-containing transparent chips, about 0.1 to about 5.0 parts by weight of colored material, and about 0.01 to about 2.5 parts by weight of curing agent, per about 1 part by weight of the transparent resin to form a resin mixture, curing the resin mixture in a dry oven, and drying the cured resin mixture at room temperature. Preparing the transparent chips under the conditions above may minimize or prevent stickiness or peeling.

In exemplary embodiments, the resin mixture can be cured at a temperature of about 130° C. for a time period of about 60 minutes, and the cured resin mixture can be dried at room temperature (25° C.) for a time period of about 30 minutes.

As the colored material dispersed in the highly transparent resin coats the surface of the silica-containing transparent chips, a transparent surface can be formed on the surface of the chips.

In the preparation of the transparent chips for artificial stone, the colored material, such as a metal powder, can be added to the transparent resin and uniformly dispersed therein to form a resin mixture. A curing agent can also be added to the resin mixture. The silica-containing transparent chips can then be mixed with the resin mixture to uniformly coat the chips.

In the present invention, the colored material coated transparent chips can have a specific gravity of about 2.0 to about 2.65 and a Mohs hardness of about 5 to about 9. The range of specific gravity can be obtained by coating silica-containing transparent chips with a colored material of metal powder.

The colored material coated transparent chips can have the same surface hardness as sand or silica chips, which can be advantageous when the colored material coated transparent chips are used in combination with a silica type filler in an artificial stone. To this end, if the colored material coated transparent chips do not have a surface hardness which is the same as or similar to the surface hardness of sand or silica chips, it can be difficult to provide a uniform surface to an artificial stone material in a downstream surface treatment step. In other words, if the surface hardness of the colored material coated transparent chips is not the same as that of sand or silica chips also present in the artificial stone material, the weaker surface of the chips can be ground more during a grinding process so as to produce a non-uniform surface. Accordingly, as glass has a Mohs hardness of about 5 and silica chips have a Mohs hardness of about 7, the colored material coated transparent chips can have a Mohs hardness of about 5 to about 9 in the present invention.

At least one of the above and other features and advantages may be realized by providing artificial stone with natural metal-like texture and patterns by mixing the colored material coated transparent chips and inorganic filler with a matrix polymer resin. The artificial stone of the present invention can be prepared by mixing about 4 to about 24 parts by weight of inorganic filler and about 0.1 to about 5.0 parts by weight of the colored material coated transparent chips, per about 1 part by weight of a base resin. A small amount of curing agent, cross-linking agent, pigment powder, and/or catalyst may be added to the mixture.

The inorganic filler may include a silica component. The curing agent may be employed in an amount of about 0.01 to about 0.05 parts by weight, the cross-linking agent in an amount of about 0.01 to about 0.05 parts by weight, the pigment powder in an amount of about 0.01 to about 0.15 parts by weight, and the catalyst in an amount of about 0.001 to about 0.005 parts by weight, per about 1 part by weight of the matrix resin. Exemplary resins useful as the matrix resin include without limitation unsaturated polyester resins, polymethyl methacrylate resins, vinyl ester resins, and the like, and combinations thereof.

In an exemplary embodiment, the artificial stone according to the present invention can be prepared by mixing about 4 to about 24 parts by weight of inorganic filler, about 0.1 to about 5.0 parts by weight of the colored material coated transparent chips, about 0.01 to about 0.05 parts by weight of curing agent, about 0.01 to about 0.05 parts by weight of cross-linking agent, about 0.01 to about 0.15 parts by weight of pigment powder, and about 0.001 to about 0.005 parts by weight of catalyst, per about 1 part by weight of unsaturated polyester resin as a matrix resin to form a resin mixture, forming the resin mixture in a mold, pressing the resin mixture, and surface-treating the resultant article.

In exemplary embodiments, the artificial stone can be prepared by mixing the noted components as discussed herein to form a resin mixture, adding the resin mixture to a mold, pressing and curing the resin mixture in the mold using conventional conditions as known in the art, for example at a temperature of about 25° C. to about 30° C. and a pressure of about 4.0 bar for a time period of about 150 seconds, and optionally surface treating the resultant cured article using conventional techniques as known in the art, such as grinding.

The colored material coated transparent chips can have a specific gravity of about 2.0 to about 2.65, while the matrix resin can have a specific gravity of about 2.2 to about 2.8. In other words, the specific gravity of the transparent chips can be equal to or lower than the specific gravity of the matrix resin, which can promote uniform distribution of the transparent chips in the matrix resin. Uniformly distributing the transparent chips in the matrix resin can minimize or prevent the breaking phenomena between the transparent chips and the matrix resin, which in turn can promote a natural metal-like texture and patterns.

Exemplary inorganic fillers include without limitation silica, aluminum hydroxide, magnesium hydroxide, calcium carbonate, barium sulfoxide, aluminum trihydrate, calcium alumino acid and the like, and combinations thereof. Exemplary silica filler can include without limitation silica sands, silica chips, or silica powder. Silica filler can be useful in various embodiments of the invention to provide good hardness and to prevent the breaking phenomena during the grinding process.

The artificial stone according to the present invention can be polished during the grinding process to expose natural metal-like texture and patterns on the surface. The natural metal-like texture and patterns of the artificial stone appear to be similar to gig galaxy or medium galaxy.

The invention will be more readily understood by reference to the following exemplary embodiments which have been set forth solely for purposes of exposition and which are not intended to limit the scope of the invention.

EXAMPLE

Preparation of Transparent Chips with Natural Metal-like Texture by Coating Silica-Containing Transparent Chips with Colored Material 1 part by weight of an acrylic urethane resin (product of Norupyo-paints Co., Ltd. of Korea), 2 parts by weight of a curing agent for the resin (product of Norupyo-paints Co., Ltd. of Korea), 4 parts by weight of a copper powder (product of Junsung Co., Ltd. of Korea), and 300 parts by weight of transparent glass chips with a length of about 1.0 to 5.0 mm prepared from transparent glass (product of Aju Industries Co., Ltd. of Korea) are mixed in a mixer to form a mixed resin composition. The mixed resin composition is kept in a dry container and cured in an oven at 80° C. for about 2 hours, and the cured resin is dried at room temperature over 2 hours. FIG. 1 illustrates a photograph of the colored material coated transparent chips prepared in accordance with this example.

Preparation of Artificial Stone from Transparent Chips Coated with Colored Material:

1 part by weight of a commercially available unsaturated polyester resin, 6.0 parts by weight of silica sand with a length of about 0.1 to 1.0 mm as inorganic filler, 0.3 part by weight of colored material coated transparent chips of Example 1, 0.02 part by weight of t-butyl peroxy benzoate (AKZO Chemical Co. Ltd), 0.01 part by weight of a silane coupling agent (Hung Pai Chemical Co.), 0.002 part by weight of a 6% cobalt naphthanate (Jinyang Chemical Co., Ltd.), and 0.1 part by weight of an inorganic pigment (Wooshin pigments Co., Ltd.) are mixed in a mixer to form a resin composition.

After mixing, the resin composition is uniformly placed in a rectangular mold. The mold is vibrated and pressed for uniform distribution of the resin composition in the mold. The molded resin composition is pressed and cured and surfacetreated with a grinding process to prepare an artificial stone having natural metal-like texture and pattern.

Figure 2:
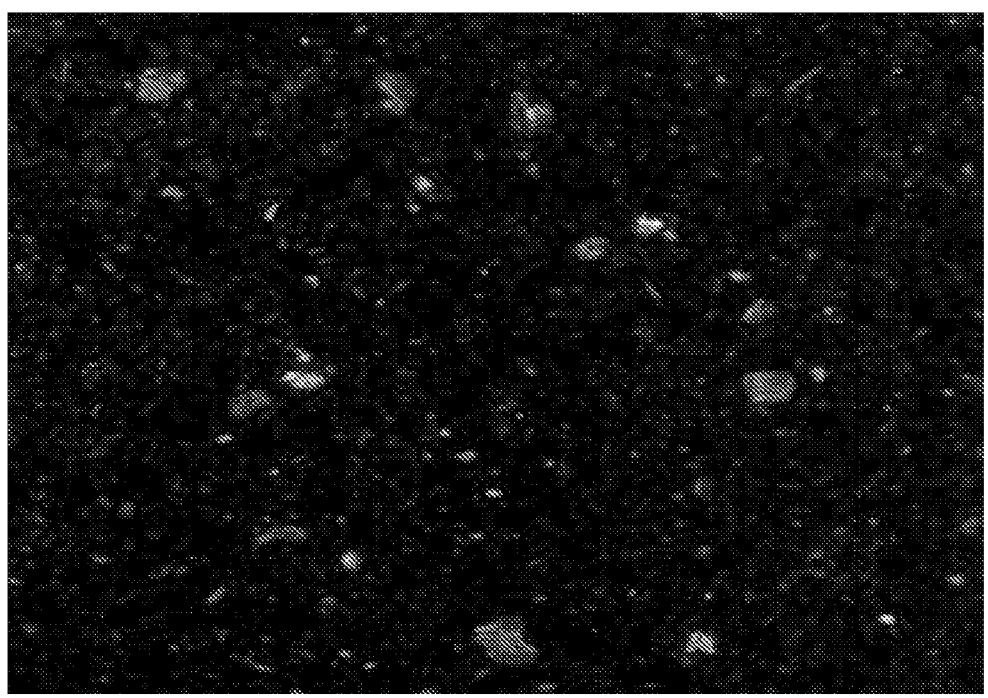
FIG. 2 is a photograph of exemplary surface patterns of artificial stone articles according to an embodiment of the present invention.

FIG. 2 illustrates a photograph of the surface patterns of the artificial stone article prepared according to this example. The artificial stone according to the present invention has an excellent natural metal-like texture and patterns, as observed with the naked eye.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

The invention claimed is:

1. Transparent chips for artificial stone with a natural metal-like texture and pattern, comprising silica-containing transparent chips uniformly coated on the outer surface thereof with a coating formed of transparent resin selected from the group consisting of urethane acrylate resins, unsaturated polyester resins, polyester polyol resins, and combinations thereof and a colored material uniformly dispersed in the transparent resin, wherein the transparent chips have a specific gravity of about 2.0 to about 2.65, and wherein the transparent chips comprise of about 80 to about 500 parts by weight of silica-containing transparent chips and about 0.1 to about 5.0 parts by weight of colored material, per about 1 part by weight of the transparent resin.

2. The transparent chips of claim 1 wherein said silica-containing transparent chips comprise broken-stone chips, quartz chips, quartz-silica chips, silica stone powder, quartz glass chips, synthetic quartz chips, silica chips, silicon dioxide chips, silica glass chips, mirror chips, or a combination thereof.

3. The transparent chips of claim 1 wherein said colored material comprises gold powder, silver powder, copper powder, aluminum powder, nickel powder, or a combination thereof.

4. The transparent chips of claim 1 wherein said colored material further comprises aluminum paste, glitter, or a mixture thereof.

5. The transparent chips of claim 1 wherein said transparent chips have a Mohs hardness of about 5 to about 9.

6. The transparent chips of claim 1, wherein said transparent resin has an APHA (American Public Health Association) color index of about 10 to 70 when measured in accordance with ASTM D 4890.

7. The transparent chips of claim 1, wherein said transparent resin comprises urethane acrylate resin.

8. The transparent chips of claim 1, wherein said transparent resin comprises unsaturated polyester resin comprising saturated acid, unsaturated acid and at least one glycol.

9. The transparent chips of claim 8, wherein the glycol comprises ethylene glycol, diethylene glycol, propylene glycol, dipropylene glycol, 1,3-buthane diol, 1,6-hexane diol, secondary alcohol, tertiary alcohol, quaternary alcohol, or a combination thereof, wherein the saturated acid comprises phthalic anhydride, terephthalic acid, isophthalic acid, or a combination thereof, and wherein the unsaturated acid comprises maleic acid, fumaric acid, itaconic acid, or a combination thereof.

10. The transparent chips of claim 8, wherein unsaturated polyester resin further comprises one or more monomers for controlling viscosity.

11. The transparent chips of claim 10, wherein said one or more monomers for controlling viscosity comprises styrene or diallyl phthalate.

12. The transparent chips of claim 11, wherein said unsaturated polyester resin is prepared by mixing about 40 to about 90% by weight of the unsaturated polyester resin comprising saturated acid, unsaturated acid, and at least one glycol with about 10 to about 60% by weight of the one or more monomers for controlling viscosity.

13. Artificial stone with natural-like metal texture and patterns, comprising the transparent chips of claim 1, polymer matrix resin, and inorganic filler, wherein said transparent chips and said inorganic filler are dispersed in the polymer matrix resin.

14. The artificial stone of claim 13 comprising about 4 to about 24 parts by weight of the inorganic filler and wherein the matrix resin comprises an unsaturated polyester resin.

15. The artificial stone of claim 13 wherein the matrix resin comprises unsaturated polyester resin, poly methyl methacrylate resin or vinyl ester resin.

16. The artificial stone of claim 13 further comprising curing agent, cross-linking agent, pigment powder, and catalyst.

17. The artificial stone of claim 13 wherein the transparent chips have a specific gravity of about 2.0 to about 2.65 and the matrix resin has a specific gravity of about 2.2 to about 2.8, and wherein the specific gravity of the transparent chips is equal to or lower than the specific gravity of the matrix resin.

* * * * *